April 4, 1939. H. DREYFUSS 2,153,242

CAR COMPARTMENT ILLUMINATING AND VENTILATING MEANS

Filed Dec. 3, 1936 3 Sheets-Sheet 1

Inventor
Henry Dreyfuss
By
Attorney

April 4, 1939. H. DREYFUSS 2,153,242
CAR COMPARTMENT ILLUMINATING AND VENTILATING MEANS
Filed Dec. 3, 1936  3 Sheets-Sheet 3

Inventor
Henry Dreyfuss
By
Attorney

Patented Apr. 4, 1939

2,153,242

UNITED STATES PATENT OFFICE 2,153,242

CAR COMPARTMENT ILLUMINATING AND VENTILATING MEANS

Henry Dreyfuss, New York, N. Y., assignor to The New York Central Railroad Company, a corporation of New York Application December 3, 1936, Serial No. 114,076

2 Claims. (Cl. 240—7.35)

This invention relates to railway passenger car compartment illuminating and ventilating means, such as, for example, the compartment section of a parlor car or other like compartments of a railway passenger car. The invention is particularly directed to an overhead fixture for illuminating the car and to associated means for supplying conditioned air to the compartment and, if desired, discharging vitiated air therefrom.

One object of the invention is to provide means for illuminating the compartment by means of one or more concealed lights, in such manner as to give adequate illumination without glare in the eyes even in the event of a person looking directly upward toward the light.

Another object is to provide illuminating means of the character described which is simple of construction and furnishes an ornamental adjunct to the interior finish and appurtenances of the compartment.

Still another object of the invention is to provide means in association with and in part formed by the illuminating fixture for supplying conditioned air to the car and, if desired, exhausting vitiated air therefrom, whereby a compact arrangement for these dual purposes is produced.

With these and other objects in view, the invention consists of the features of construction, combination and arrangement of parts, hereinafter fully described and claimed, reference being had to the accompanying drawings, in which:

Figure 1:
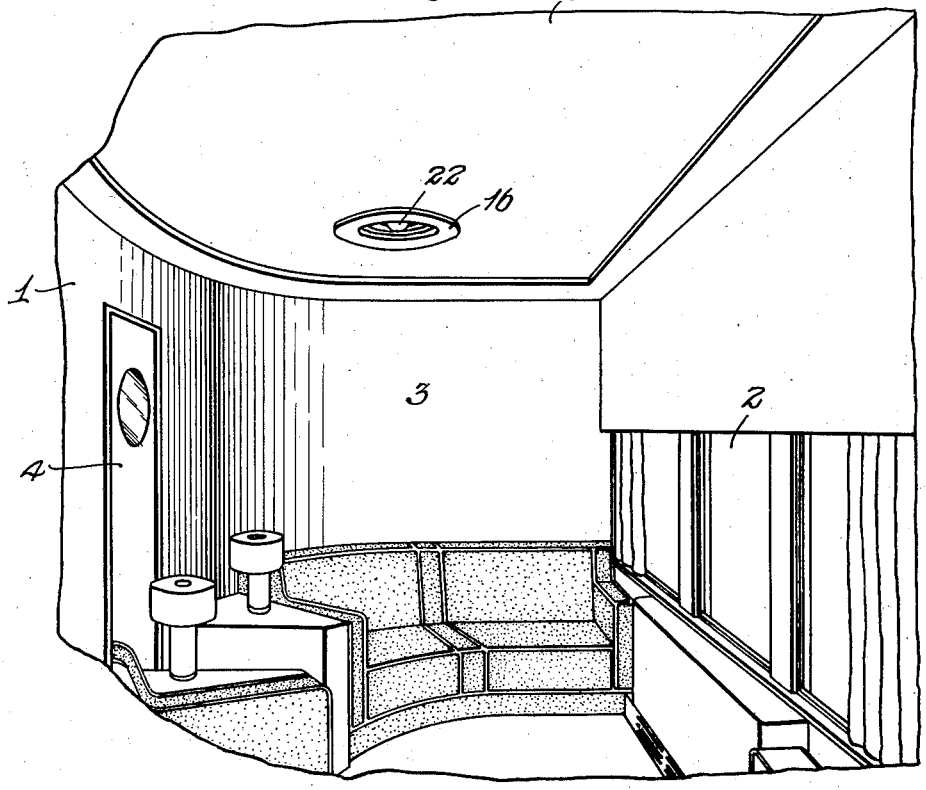
Fig. 1 is a perspective view of a portion of the interior of a car compartment of the character described, showing the arrangement of external parts of the invention in the ceiling thereof.
Figure 5:
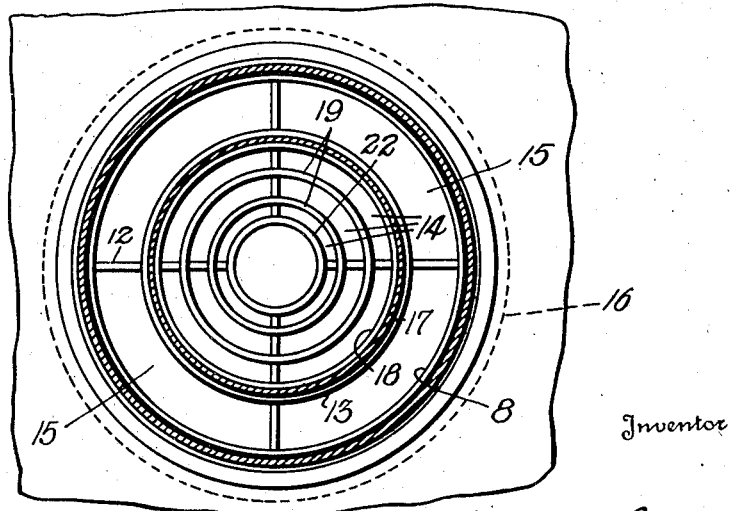
Fig. 5 is a section on line 5—5 of Fig. 3.

Referring now more particularly to the drawings, 1 designates a car compartment facing at one side windows 2 in one of the side walls of the car and separated from other portions of the car by a partition wall 3, in which is a door 4 permitting passage between the compartment and other portions of the car. This compartment may be of suitable form and construction and provided with interior furnishings and appurtenances adapting it for any particular use for which it is intended.

The ceiling 5 of this compartment is suitably spaced from the roof (not shown) and is provided with a circular aperture 6. Extending upwardly from this aperture in the space between the ceiling and roof is a casing or chamber 7 secured at its base to the ceiling and within the base of which is arranged a reinforcing or frame ring 8 also secured to the ceiling. Mounted in this chamber 7 is a lamp supporting holder 9 carrying a lamp socket 10 in which is fitted a lamp 11. This lamp projects downwardly so that the end of its bulb lies centrally of its aperture and equally spaced all around from the ring 8. Disposed also in the aperture and rigidly connected by radial arms or fins 12 with the frame ring 8 is a second smaller frame ring 13 which is located at a sufficient distance from the lamp bulb to provide an annular light passage 14 and from the ring 8 to provide an annular air passage 15. Arranged beneath the air passage 15 is an annular baffle plate or ring 16 which is trough-shaped in cross-section and is provided with an upstanding circular flange or attaching tube 17 extending upwardly into and above the ring 13 to which it is fastened, whereby the baffle member 16 is supported in position.

The frame members 8 and 13 provide an annular grating defining the passages 14 and 15 and serving to support the baffle 16. This frame or grating may be fixed in position and constitute like the chamber 7 a permanently mounted part of the equipment. Within the space or light opening 14 bounded by the ring 13 is arranged a second grating in the form of a ring 18 provided with a suitable number of annular shield plates or louvres 19 separating it into a plurality of light passages surrounding the bulb of the lamp 11. This light transmitting grating may be detachably secured in position by means of suitable fastenings 20, so that it may be conveniently removed whenever required for cleaning, repairs or renewal of any parts and the substitution of a new lamp for a worn out one.

Disposed within the chamber 7 and about the upper portion of the lamp is a dome-shaped reflector 21 which may be secured at its top with the lamp socket to the holder 9 and which has its lower edge fitted snugly within the upwardly projecting portion of the flange or tube 17 of the baffle 16. This reflector is arranged to intercept the rays of light from the lamp 11 and to reflect the same downwardly through the light passages between the louvres 19 of the light transmitting grating. A cup-shaped shield 22 is carried by the light transmitting grating and arranged to enclose the lower portion of the lamp bulb. This shield 22 may be made of opaque or translucent material and serves to prevent the rays of light from the lamp from shining directly down into the compartment and to conceal the light bulb from the view from below. This shield cooperates with the louvres 19 to conceal the bulb and reflector, the arrangement of the louvres being such as to lie in the line of vision of a person looking diagonally upwardly from below toward the fixture so as to conceal the stem of the lamp and the reflector. By this means light glare into the eyes of an observer, even when looking from below up at the fixture, will be prevented, while there will be no interference with the direct downward reflection of light rays emitted by the lamp and reflected by the reflector 21 through the spaces of the louvres, whereby an effective direct lighting of the compartment 3 will be obtained. The casing or chamber 7 is connected in any suitable manner with an air duct 23 forming part of an air conditioning equipment of the car. Through this duct conditioned air is supplied to ventilate and regulate the atmospheric condition of the compartment 3. The air entering the chamber 7 through the duct 23 flows downwardly about the holder 9 and reflector 21 and keeps the same cool, and then flows downwardly through the air passages 15 into the compartment 3. The air discharging through the passages 15 strikes the annular baffle plate 16 and is deflected thereby outwardly and uniformly in all directions toward all sides of the upper portion of the compartment 3, the trough-like form of the baffle serving to prevent the air from passing too abruptly downwardly at the center of the compartment. By this means a direct downward flow of air at the center of the compartment is prevented and the air properly diffused so as to prevent the production of draft.

It will be understood that the exposed parts of the fixture may be suitably finished to conform to the style and finish of the walls and furnishings of the compartment 3 so that a fixture having exposed parts of an attractive character will be provided. This fixture will give general direct illumination free from glare and with the light rays so diffused that a pleasing character of illumination will be furnished. At the same time the compartment will be supplied with conditioned air to keep it thoroughly ventilated and the occupants of the car comfortable.

Figure 2:
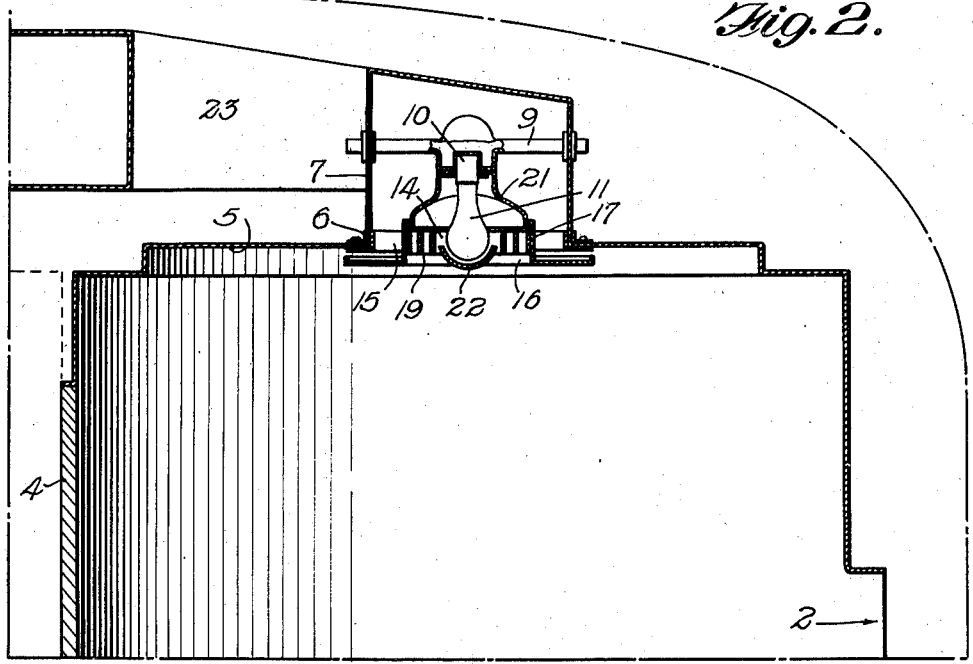
Fig. 2 is a sectional view through a portion of the compartment and the light fixture and air supplying means.
Figure 3:
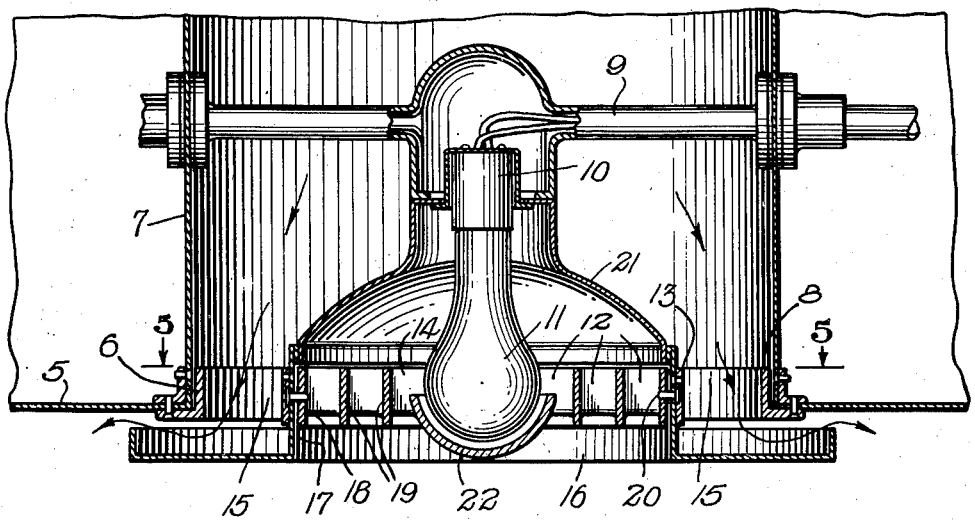
Fig. 3 is a similar view of parts shown in Fig. 2 on an enlarged scale.
Figure 4:
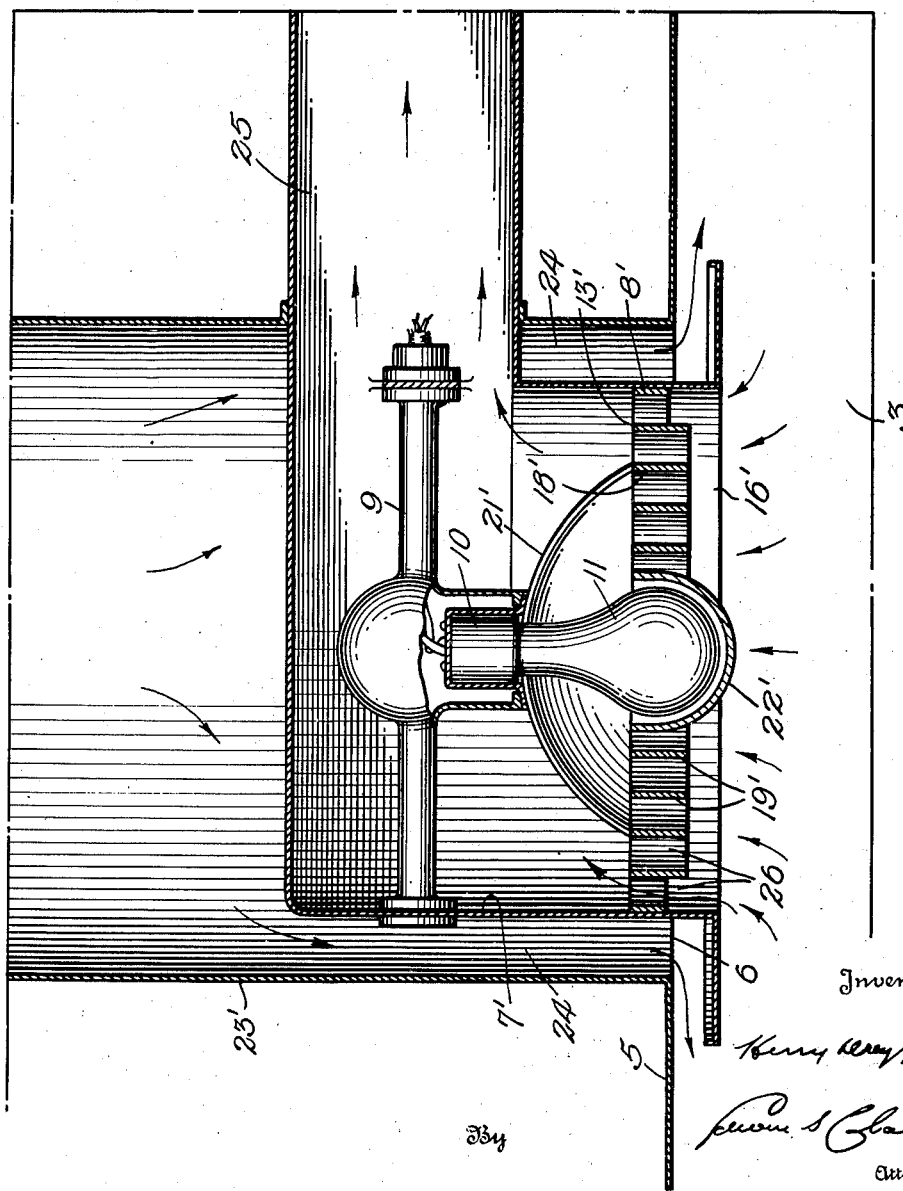
Fig. 4 is a view similar to Fig. 3 showing a modified construction of light fixture and air supplying means, in which provision is also made for exhaust of vitiated air.

Fig. 4 shows a modified form of the invention in which parts 8', 13', 18', 19', 21' and 22' corresponding to the parts 8, 13, 18, 19, 21 and 22, but of somewhat modified form and arrangement, are employed. The parts 8', 13', 18', 19', 21' and 22' may be, as shown in Fig. 4, of unitary type or may be of identically the same structure as that shown in Figs. 1 and 2. These parts are arranged with the lamp support and lamp in a casing 7' to which the annular trough-shaped baffle 16' is secured in any suitable manner. The casing 7' is surrounded by an air supply duct 23' which is arranged to form with the casing 7' a channel or passage 24 lying about the base of the chamber 7' for the supply of conditioned air to the car. The trough-shaped portion of the baffle 16' is arranged beneath this passage for diffusing the air uniformly in all directions into the top of the compartment 3 as previously described in connection with the construction shown in Figs. 1, 2 and 3. The casing or chamber 7' in this modified construction is provided with an outlet 25 for the discharge of vitiated air from the compartment, and the spaces between the rings 8', 13' and 18' provide outlet passages 26 for the discharge of the vitiated air from the compartment into the casing 7'. The outlet 25 may be in communication with an exhaust fan or other suitable means for drawing the vitiated air from the top of the compartment 3.

From the foregoing description, taken in connection with the drawings, it will be seen that my invention provides a ceiling illuminating fixture for the compartments of railway cars and other rooms or compartments whereby direct light, wholly free from glare, may be supplied to illuminate the compartments. Also it will be seen that a type of fixture is provided in which the light emitting and reflecting elements are concealed from view of any one in the compartment, so that the eyes of any person looking diagonally upward toward the fixture will be protected from any direct light rays. Furthermore, it will be seen that my invention provides means whereby the same fixture may be used for the supply of conditioned air to the compartment and, if desired, the exhaust of vitiated air therefrom, whereby the atmosphere of the compartment may be maintained in a wholesome and comfortable condition and overheating of any of the parts in the illuminating chamber prevented.

What I claim is:

1. A compartment having a ceiling provided with an aperture therein, an annular ventilating casing rising from the aperture, a frame ring disposed within the base of the casing in line with the aperture and concentric with and in spaced relation to said casing so as to provide an air passage therebetween connecting the compartment with said chamber, an incandescent lamp arranged within the chamber and having its bulb portion depending into the space bounded by the frame ring, a reflector fixed to the casing and surrounding the lamp above the annular member and having a dome-shaped part overhanging the annular member in closing relation thereto, said dome-shaped part having its concaved side facing downward and forming a reflecting surface for reflecting light rays from the lamp downward through the annular member, a shield disposed centrally of the annular member beneath the bottom of the bulb for preventing direct downward transmission of light rays therefrom, a unitary grating comprising a plurality of ring-shaped members disposed edgewise in a vertical plane concentric with each other and with the annular member and in the space between the annular member and bulb portion of the lamp to provide unobstructed passages for the direct downward reflection of light rays from the reflector and baffles about said shield and coacting therewith to guard said space from visual observation of said lamp therethrough from below, and means detachably connecting the grating with the frame ring.

2. A compartment having a ceiling provided with an aperture therein, an annular ventilating casing rising from the aperture, a frame ring disposed within the base of the casing in line with the aperture and concentric with and in spaced relation to said casing so as to provide an air passage therebetween connecting the compartment with said chamber, an incandescent lamp arranged within the chamber and having its bulb portion depending into the space bounded by the annular member, a reflector surrounding the lamp above the annular member and having a dome-shaped part overhanging the annular member in closing relation thereto, said dome-shaped part having its concaved side facing downward and forming a reflecting surface for reflecting light rays from the lamp downward through the annular member, a shield disposed centrally of the frame ring beneath and about the bottom and lower portion of the bulb for preventing direct downward transmission of light rays therefrom, a grating comprising a plurality of ring-shaped members disposed edgewise in a vertical plane concentric with each other and with the annular member and in the space between the frame ring and bulb portion of the lamp to provide unobstructed passages for the direct downward reflection of light rays from the reflector and baffles about said shield and coacting therewith to guard said space from visual observation of said lamp therethrough from below, and an annular baffle plate having at its inner periphery an upstanding tubular portion fixed to the frame ring and surrounding the shield and a horizontal portion extending from said tubular portion beneath said air passage in spaced relation thereto and below and in parallel relation to the ceiling.

HENRY DREYFUSS.